United States Patent [19]

Hunt et al.

[11] 4,156,814

[45] May 29, 1979

[54] APPARATUS FOR PRODUCING IONS OF THERMALLY LABILE OR NONVOLATILE SOLIDS

[75] Inventors: Donald F. Hunt; Jeffrey Shabanowitz, both of Charlottesville, Va.

[73] Assignee: University of Virginia, Charlottesville, Va.

[21] Appl. No.: 822,216

[22] Filed: Aug. 5, 1977

Related U.S. Application Data

[63] Continuation-in-part of Ser. No. 809,770, Jun. 24, 1977, abandoned.

[51] Int. Cl.[2] .............................................. G01M 21/24

[52] U.S. Cl. ................................ 250/423 P; 250/288; 313/351

[58] Field of Search ............... 250/288, 423 R, 423 F; 313/328, 329, 351

[56] References Cited

U.S. PATENT DOCUMENTS 3,852,595 12/1974 Aberth ................................ 250/288

4,023,398 5/1977 French et al. ........................ 250/288

FOREIGN PATENT DOCUMENTS 1442998 7/1976 United Kingdom ................. 250/423 F

*Primary Examiner*—Harold A. Dixon

*Attorney, Agent, or Firm*—Oblon, Fisher, Spivak, McClelland & Maier

[57] ABSTRACT

An apparatus for ionizing and vaporizing non-volatile or thermally labile molecules of a sample for introduction into a mass spectrometer analyzer which comprises a housing containing an ionization chamber; an ion exit port for the introduction of gaseous ions from said ionization chamber into a mass spectrometer analyzer on the portion of the housing attached to said mass spectrometer analyzer; inlet means for introducing a gaseous reactant into said ionization chamber within said housing; inlet means for admitting high energy radiation into said ionization chamber within said housing to at least partially ionize the molecules of said gaseous reactant; aperture means open into said ionization chamber of said housing for admitting a conductive emitter characterized by having a conductive element of a highly irregular surface upon which is deposited said sample for analysis into said mass spectrometer analyzer; and a vacuum exit aperture in said housing by which the pressure within said ionization chamber can be reduced.

8 Claims, 9 Drawing Figures

APPARATUS FOR PRODUCING IONS OF THERMALLY LABILE OR NONVOLATILE SOLIDS

The invention described herein was made in the course of or under contracts from the Department of Health, Education and Welfare, the National Science Foundation and the Department of the Army.

CROSS-REFERENCE TO RELATED APPLICATIONS

This application is a continuation-in-part of application Ser. No. 809,770, filed June 24, 1977, now abandoned.

BACKGROUND OF THE INVENTION

1. Field of the Invention

The present invention relates to an apparatus for ionizing and vaporizing relatively nonvolatile or thermally labile compounds for analysis in a mass spectrometer.

2. Description of the Prior Art

In the analysis of compounds by mass spectrometry, it is necessary to ionize and vaporize the compound to be analyzed prior to passage through the mass spectrometer analyzer no matter how relatively nonvolatile the compound to be analyzed actually is. In the past, such techniques as electron impact (EI), field ionization (FI) and chemical ionization (CI) mass spectrometry have been employed for the structural analysis of salts and highly polar, thermally labile, organic molecules. However, the use of these techniques for the analysis of such types of compounds has been severely limited by the requirement that the compound to be analyzed must be in the gaseous state prior to ionization. For compounds of the above type, frequently the energy required to disrupt the bonding between contiguous molecules of the sample in the solid state or the energy between the sample molecules and the surface of the sample holder often is in excess of the energy necessary to break intramolecular bonds within the sample molecules. Thus, these techniques frequently result in substantial decomposition of sample molecules before they can undergo ionization and vaporization. Moreover, the energy from the device used to heat the sample molecules is distributed in many internal degrees of freedom in the molecules and as a result, the competition between degradation of the sample molecules by dissociation of intramolecular bonds and disruption of surface-sample and/or sample-sample interactions is dominated by the molecular degradation process.

Recently, advances have been made in the development of techniques which enhance the ionization-vaporization of sample molecules for analysis by mass spectrometry while minimizing the rate of decomposition of the molecules. In one technique, a ultra rapid heating technique is used to volatilize molecules deposited on a nickel foil. Heating is accomplished by the impact of 200 Mev $^{252}$CF fission fragments. By this technique many high molecular weight biological molecules including Vitamin $B_{12}$ have been analyzed. In another technique, strong electrostatic fields have been used to promote the ionization of polymeric, nonvolatile, or thermally labile organic molecules which are sprayed into an ion source in the form of organic solutions.

U.S. Pat. No. 3,555,272 shows a chemical ionization technique for the generation of gaseous ions from a sample in which a first gaseous reactant material and a second gaseous material which is the sample material to be analyzed are introduced into the ionization chamber of the spectrometer. The mixture of gases predominantly contains the first gaseous reactant. The gaseous mixture is then subjected to ionizing conditions to form stable ions of the gaseous reactant, which subsequently react by ion-molecule interactions with the molecules of the gaseous sample under the pressure and ionizing conditions in the ionizing chamber thereby producing gaseous ions characteristic of the sample molecules. The ionized gases are then introduced into the mass spectrometer analyzer. It is evident from the above description of the method of U.S. Pat. No. 3,555,272 that the technique described is limited only to mixtures of gaseous molecules and gaseous ions.

In still another technique, known as field desorption (FD) mass spectrometry, a strong electrostatic field is set up between a plate electrode which functions as a cathode and an anode upon which is deposited the material to be ionized and vaporized. The cathode also contains a port through which gaseous ions pass into the mass spectrometer analyzer. When the electrostatic field is generated, sample molecules suffer ionization and are desorbed as ions into the gaseous state. The anode or emitter is formed of a 10 μm tungsten wire covered with a large number of carbon microneedles which are about 30 μm in length. The potential difference between the anode and cathode plate is on the order or 10,000 volts and the chamber which houses the sample is under a high vacuum of $10^{-5}$ to $10^{-7}$ torr. The above potential produces a field at the emitter which is on the order of 1 V/Å. The anode or emitter is heated by a flowing current until sample ions are observed on the mass spectrometer recorder. It is believed that ionization of the molecules coated on the emitter anode occurs by the combined effect of thermal energy and the applied field. In other words, electrons from sample molecules tunnel through to the emitter wire and the resulting coulombic repulsion expels the ions from the emitter. The ions enter the gaseous phase and traverse the mass analyzer part of the spectrometer. The principal features of the field desorption technique are the use of (1) an activated surface (emitter), i.e., an anode formed by the deposition of carbonaceous dendrites on thin tungsten wire or in a more recent embodiment of such an anode, rough metal surfaces formed by breaking a brittle metal (tungsten) rod of 1 mm (OD) or by electrochemical processes, and (2) a high field on the order of 10,000 volts (1 V/Å). However, a disadvantage of the field desorption technique is that the high electrostatic potentials required prevent the technique from being used under chemical ionization (CI) conditions when the ion source is filled with a reagent gas at a pressure on the order of 0.1-1 torr. At these pressures in the ionization chamber, most gases conduct electric current and severe arcing occurs if a 10,000 volt field is present. The high field requirement renders it extremely difficult to use the field desorption technique for sample ion production in quadrupole mass spectrometers. Under FD conditions ions are expelled from the emitter with energies on the order of 10,000 volts. Since the quadrupole mass filter only functions efficiently when the ion energy is in the range of 0-40 volts, the FD ion source must be modified substantially in order to decelerate the ions to velocities compatible with the requirements of the quadrupole mass filter.

A need, therefore, continues to exist for a field desorption technique which can be used satisfactorily for ion generation and introduction at relatively low energies and velocities such as are required for quadrupole mass spectrometers.

SUMMARY OF THE INVENTION

Accordingly, one object of the present invention is to provide an apparatus for ionizing and desorbing nonvolatile or thermally labile molecules of a solid sample from an emitter into the gaseous phase as ions under relatively low energy conditions in the ionization chamber of a mass spectrometer for analysis by the spectrometer.

Briefly, this object and other objects of the invention as hereinafter will become more readily apparent can be attained by an apparatus for ionizing and vaporizing nonvolatile or thermally labile molecules of a solid sample for introduction and analysis in a mass spectrometer which comprises a housing containing an ionization chamber; an ion exit port for the introduction of gaseous ions from the ionization chamber into a mass spectrometer analyzer on the portion of the housing attached to the mass spectrometer analyzer; inlet means for introducing a gaseous reactant into the ionization chamber within said housing; inlet means for admitting high energy radiation into the ionization chamber with the housing to at least partially ionize the molecules of the gaseous reactant; aperture means open into the ionization chamber of the housing for admitting a conductive emitter characterized by having a conductive element of a highly irregular surface upon which is deposited said sample for analysis into said mass spectrometer analyzer; and a vacuum exit aperture in said housing by which the pressure within said ionization chamber can be reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein like reference numerals in the figures refer to the same features in each figure and wherein.

DETAILED DESCRIPTION OF THE PREFERRED EMBODIMENT

The present invention provides an apparatus by which solid samples, particularly those which are normally difficult to volatilize such as salts and other highly nonvolatile molecules, can be ionized and volatilized with minimal decomposition of the molecules for introduction into a mass spectrometer analyzer and in particular, to a quadrupole mass spectrometer. Representative relatively nonvolatile substances include polypeptides as well as inorganic and organic salts. Specific examples of nonvolatile or thermally labile organic compounds which can be successfully analyzed by the present technique include cyclic adenosine monophosphate, creatine, guanosine, arginine hydrochloride, Dioxathon (commercial pesticide), choline chloride, sodium benzoate and the like. It is important to emphasize, however, that the present invention is applicable to the ionization and volatilization of nonvolatile molecular substances as well as thermally labile molecules and therefore is not limited to any particular type or class of solid substance.

The present apparatus for ionizing and volatilizing a solid sample material in many respects represents the combination of the emitter used in field desorption methodology and the apparatus employed for the mass spectrometeric analysis of ions by the chemical ionization technique. However, in the apparatus of the present technique a large potential difference between an anode (the emitter coated with the solid substance to be analyzed) and a cathode plate which contains the ion exit port through which gaseous ions pass into the mass spectrometer analyzer is not employed. This high field in the ionization chamber is an essential feature of field desorption methodology. To the contrary, in the present invention, an emitter coated with the solid substance to be analyzed is placed in an ionization chamber of a mass spectrometer where it is exposed to gaseous ions created by bombardment of a gaseous substance by a high energy source such as an electron beam. Simultaneously, a current is passed through the emitter to heat the sample. The result is that the solid sample is ionized and vaporized and passes into the mass spectrometer analyzer without significant decomposition of the sample molecules.

Figure 1:
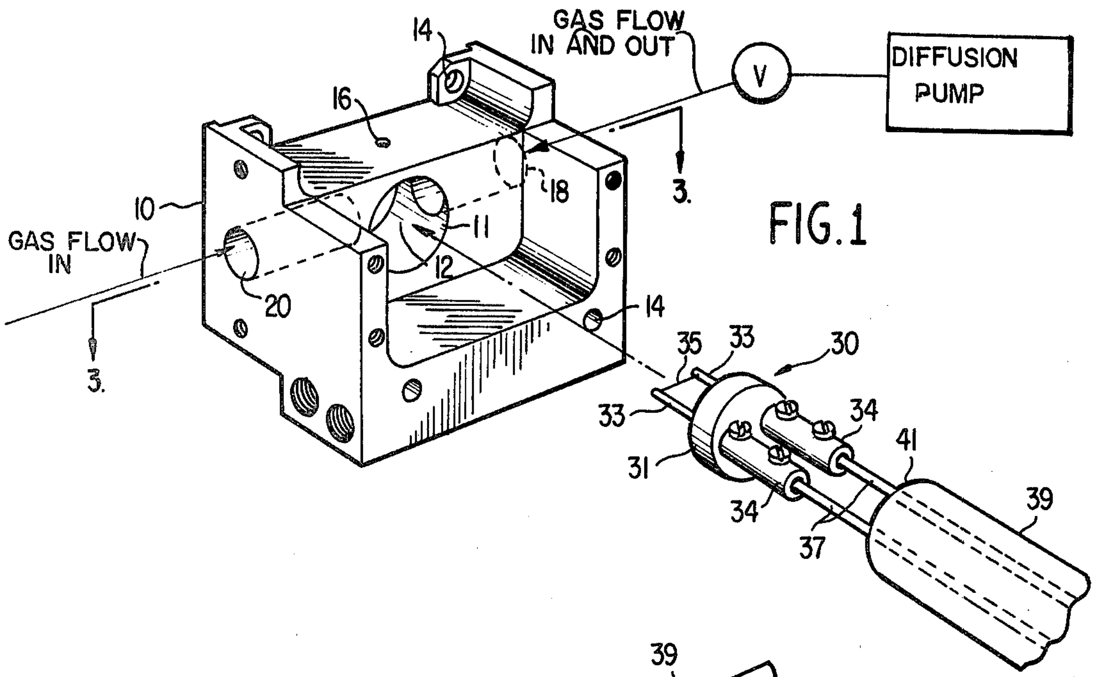
FIG. 1 is a three quarters frontal perspective view of a housing to be attached to a mass spectrometer analyzer containing an ionization chamber and conductive emitter of the present invention.

Reference is hereby made to FIGS. 1-4 of the application which fully show an arrangement of a conductive emitter and housing containing an ionization chamber within the scope of the present invention. FIG. 1 shows a housing 10 of a metal such as stainless steel which contains a hollow region 12 which is the ionization chamber of the device. Chamber 12 is open for the reception of an emitter at aperture 11. The housing is fixedly attached to the ion inlet segment of a mass spectrometer analyzer through open channels 14. The housing is provided with a small inlet port 16 which opens directly to ionization chamber 12 and which provides the means by which a high energy beam of radiation can be projected into ionization chamber 12. The housing is also provided with one open channel which traverses the housing of the ionization chamber and has an inlet aperture 20 through which a gaseous reactant can be introduced into the ionization chamber such that when the ionization chamber is subjected to a beam of high energy radiation, ions of the gaseous reactant are generated, as well as an exit and entrance aperture 18 by which the ionization chamber can be evacuated by any suitable evacuation means such as a diffusion pump. As shown in FIG. 1, an emitter 30 is provided which is formed of a ceramic insulative base 31 of a shape sufficient to adapt and seal the opening 11 to the ionization chamber 12 and which is provided with two conductive poles 33 across which is attached a conductive element 35 having a highly irregular surface upon which is deposited the solid sample to be analyzed. The conductive poles 33 are sealed within base 31 and project through base 31 such that they can be coupled by coupling means 34 to conductive leads 37 which pass through tube 39. Tube 39 also provides support for emitter 30 at its open end 41.

Figure 2:
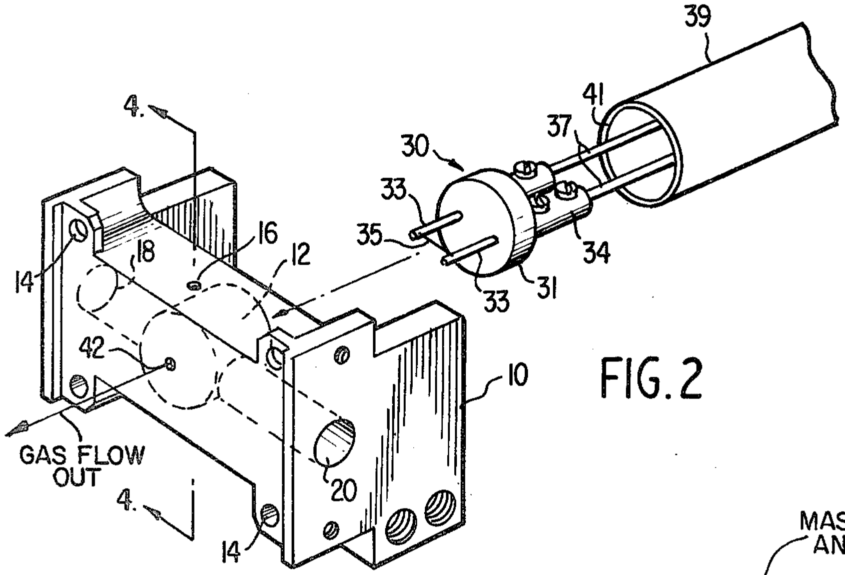
FIG. 2 is a three quarters rear perspective view of a housing containing an ionization chamber and conductive emitter of the present invention.

FIG. 2 shows a rear view of the apparatus arrangement of FIG. 1 and in this view the ion exit port 42 of the ionization chamber through which ions pass from the chamber into the mass spectrometer analyzer is visible.

Figure 3:
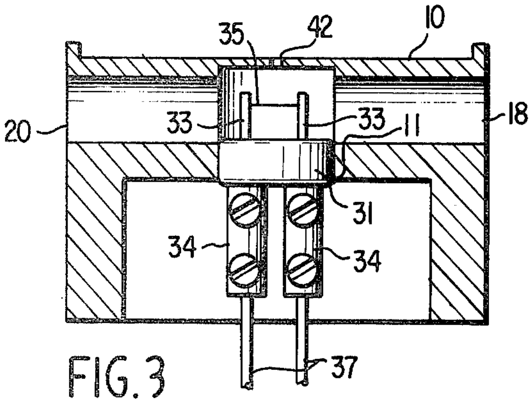
FIG. 3 is a horizontal cross-section of a housing of the present invention taken on line 3—3 of FIG. 1.
Figure 4:
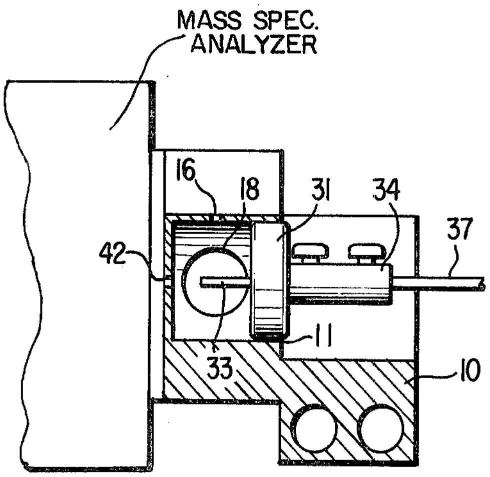
FIG. 4 is a vertical cross-section of a housing of the present invention taken on line 4—4 of FIG. 2.

FIGS. 3 and 4 are a horizontal cross-sectional view taken on line 3—3 of FIG. 1 and a vertical cross-sectional view along line 4—4 of FIG. 4, respectively. These views provide further details of an embodiment of the ionization device of the present invention.

The ionization apparatus is not limited to the apparatus described supra since other conventional devices can be adapted to achieve the same purpose of the present invention. Thus, the ionization device shown by Munson in U.S. Pat. No. 3,555,272 could be readily adapted for use as the apparatus of the present invention. It would, however, have to be modified to the extent that an aperture would have to be provided in the housing for the insertion of the emitter and the device which supports the emitter in the chamber. However, from the ionization devices which are used in field desorption methodology, it would be readily apparent how to modify the ionization device of Munson to accept the emitter and its support to complete the fabrication of the device of the present invention.

Figure 5:
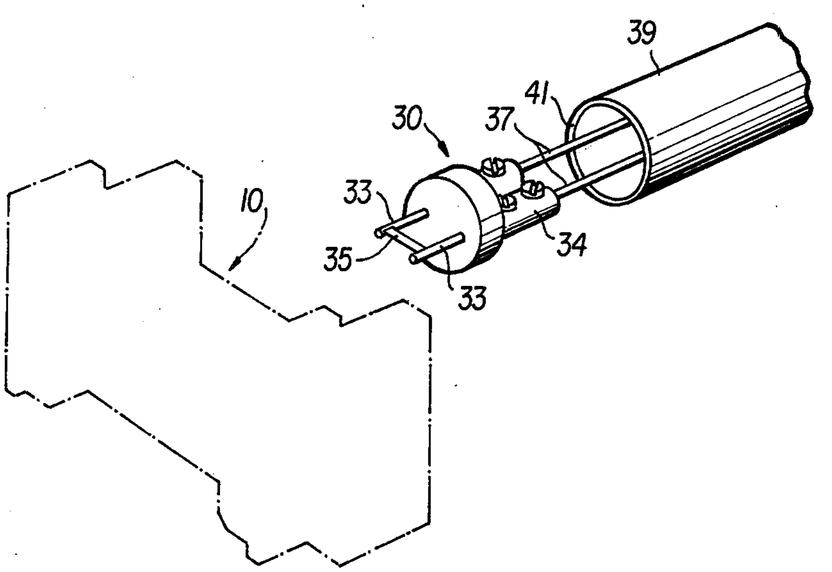
FIG. 5 is a three quarters rear perspective view of a housing containing an ionization chamber and conductive emitter razor blade.
Figure 6A:
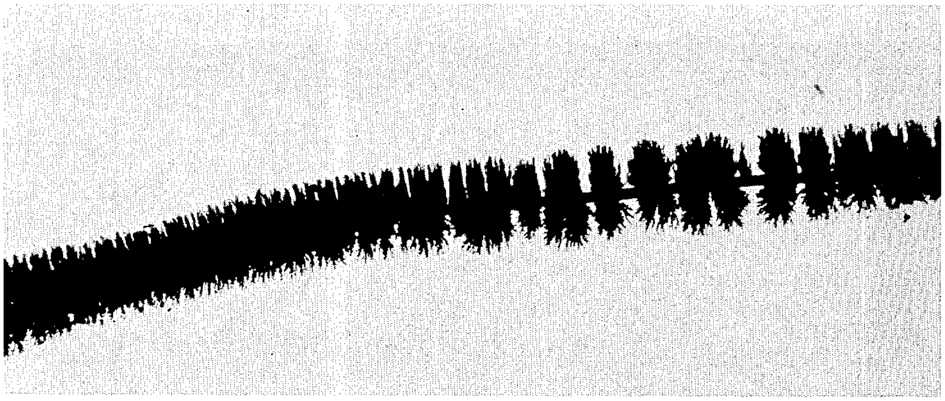
FIG. 6A-6B discloses a conductive tungsten wire emitter upon which is deposited carbon microneedles.
Figure 6B:
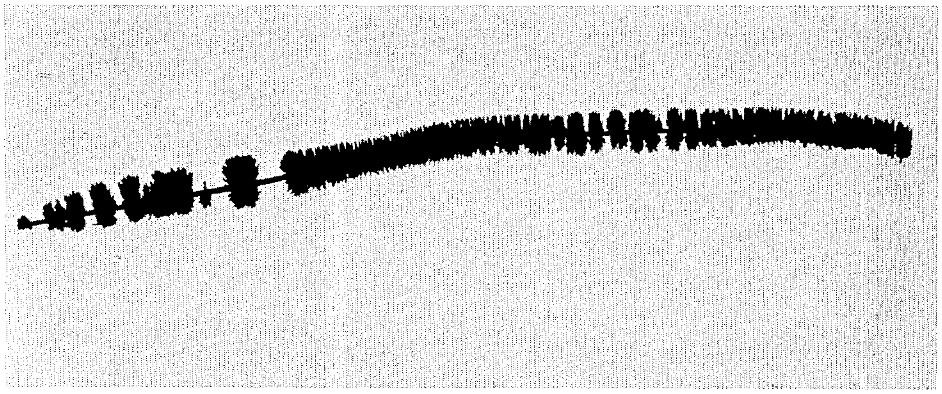
Figure 7:
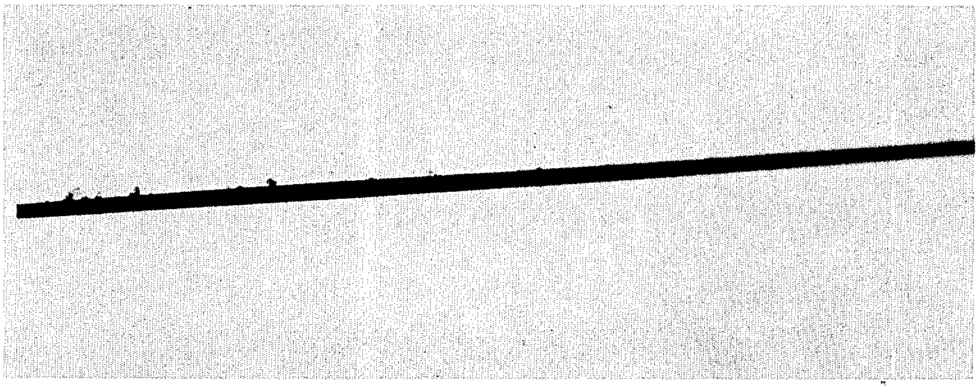
FIG. 7 shows a thin conductive wire emitter.
Figure 8:
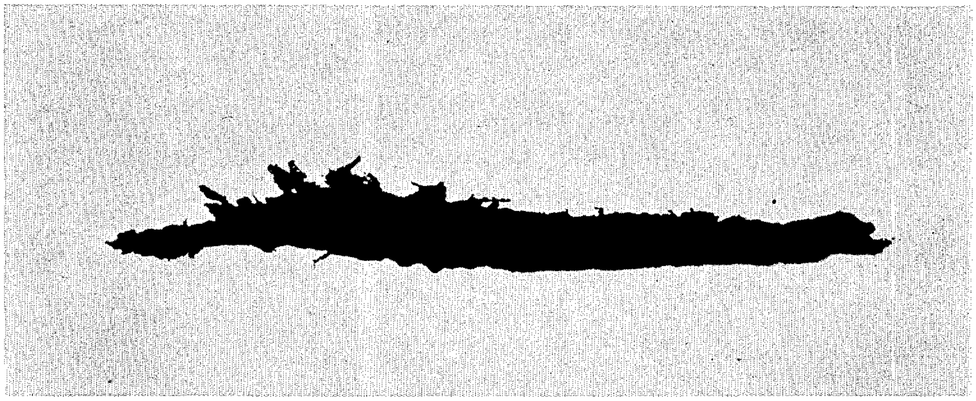
FIG. 8 shows a conductive tungsten wire emitter with dendrites deposited thereon.

The field desorption emitter 30 employed in the present method can be formed of any conductive material which contains a large number of sharp points, ridges or edges on the surface of the conductor element 35 of the emitter. This is the important feature of the emitter used in the present method. Thus, a variety of materials can be employed as emitters such as a thin wire as shown in FIG. 7, razor blade as shown in FIG. 5, a conductive wire with a carbon surface, etched metal surfaces, freshly broken, brittle rods of such metals as tungsten or titanium and the like. Another type of conductive element 35 which can be employed consists of nickel dendrites grown on tungsten wire by an electrochemical technique as shown in FIG. 5 (Rechsteiner et al., *Biomed. Mass Spectrometry,* 4(1), 52–54 (1977)). A preferred embodiment of the emitter 30 of the invention is a device commonly used in conventional field desorption studies which is a thin tungsten wire (10 μm) upon which has been deposited carbon microneedles which form a highly irregular surface on the wire. The carbon microneedles can be formed by the high temperature decomposition of benzonitrile on the tungsten wire and are commonly of a length of about 25 μm (Beckey et al., *Q. Phys. E. Sci. Instrum.*, 6, 1043 (1973)).

Once the desired emitter 30 has been chosen, the desired sample to be analyzed can be deposited on the conductive element 35 of the emitter 30 by a convenient technique. The method by which the sample is deposited is not critical. Thus, for example, a sample to be analyzed can be dissolved in any convenient solvent and the resulting solution placed onto the surface of the conductive element 35. After the solvent evaporates, the sample coated emitter is ready for use. It is also possible to coat the conductive element 35 of the emitter 30 with a sample by any convenient vapor deposition technique such as sublimation. In fact, it is possible to be able to withdraw liquid samples of fractions as they are eluted from a liquid chromatograph and analyze small portions of the separated fractions by placing drops of the eluted sample on the conductive element 35 and analyzing the components of the eluted fraction in a mass spectrometer.

The amount of sample deposited on the conductive element 35 is not critical and need only be an amount which is sufficient to yield an acceptable spectrum. Analysis typically can be performed on quantities of sample in the microgram to picogram range.

Once the sample has been deposited on the conductive element 35, it is placed within the ionizing chamber such that it is in sufficient proximity to the ion exit port for the gaseous ions generated to pass into the mass spectrometer analyzer. The emitter is most commonly located at a distance from several tenths of a millimeter to several millimeters from the ion exit port of the ionization chamber. The emitter is attached at each terminus to two conductive poles which are embedded within an insulative substrate 31 most commonly a ceramic material. A conductive lead 37 is then attached to each pole so that in use, a small current can be passed through the emitter.

Under chemical ionization conditions a gaseous material flows through the ionization chamber 12 and is ionized by high energy radiation. The high energy radiation employed need only be of sufficient energy to generate ions of the gaseous material which flows through the ionization chamber. Accordingly, suitable high energy radiation includes electron beams as well as radiation from the decomposition of unstable nuclei such as $^{63}$Ni. The high energy radiation ionizes the gaseous reactant and the resultant ionized gas interacts with the sample. Simultaneously, the sample is heated by passing a current through the conductive emitter 30. The amount of current which is passed through the conductive emitter 30 need only be that amount which is necessary to heat the sample to a sufficiently high temperature to facilitate the ionization and volatilization of the sample.

The flow rate of the gaseous reactant through the ionization chamber 12 is not critical. Usually, the flow rate of gas ranges from 5 to 20 ml/min. at atmospheric pressure. The pressure of the gas within the ionization chamber 12 is also not critical and usually ranges from about 0.1 to several torr, preferably 0.1 to 1.0 torr. The gaseous substance which flows through the ionization chamber 12 can be any gaseous substance which is used in conventional chemical ionization involving a gaseous ionic reactant with a gaseous substrate. In this regard, the disclosure of *Munson et al.,* U.S. Pat. No. 3,555,272, is herein incorporated by reference as a prior art reference which shows various gaseous reactant materials which can be ionized by a high energy source and then reacted with the substance to be analyzed. Suitable gaseous reactants include hydrogen, methane, propane, isobutane, water, hydrogen sulfide, methanol, ammonia, hexane, nitric oxide, argon, nitrogen, helium, nitrous oxide, methyl nitrite, oxygen, and the like. In fact, the pressure range of the gaseous reactant in the ionization chamber device shown by *Munson et al.* is typical of the pressure of the gaseous reactant employed in the present method. Pressures of reactant gas up to one atmosphere can be employed in the present invention.

The apparatus of the present invention can be employed for the analysis of any desired solid material in any type of mass spectrometer desired. In other words, the particular type of mass spectrometer employed to analyze the ionized and vaporized sample is not critical. The present apparatus, however, is particularly adaptable for use with a quadrupole mass spectrometer. Accordingly, the present apparatus can be used to generate vaporized ions which can be analyzed by the quadrupole mass spectrometer disclosed by *Hunt et al.* in copending U.S. application Ser. No. 795,148, filed May 9, 1977. Accordingly, the combination of the present apparatus for generating vaporized ions with such a quadrupole mass spectrometer permits the analysis of both positive and negative ions derived from nonvolatile or thermally labile molecules.

In the ionization and vaporization of a solid sample by the present apparatus, a conductive element 35 of emitter 30 coated with a solid sample is positioned within the ionization chamber and a gaseous reactant is permitted to flow through the chamber 12. A high energy beam is then passed into the chamber 12 to ionize the gaseous reactant, and, preferably, should be allowed to impinge upon the coated conductive element 35. Simultaneously, a small current is passed through the emitter 30 in order to heat the sample thereby aiding in the ionization and vaporization of the solid sample. The amount of current passed is that amount needed to facilitate the ionization and vaporization of the particular sample being analyzed. Normally, the amount of current ranges from several milliamps to several amps, preferably several milliamps to 50 milliamps.

In a preferred embodiment of the method of the present invention, the sample to be analyzed which is deposited on the conductive element of an emitter contains an amount of an ionization-volatilization promoter of at least one organic polymer and/or at least one organic salt or inorganic salt. It is well known in desorption techniques that the presence of at least one of the above-mentioned materials in the sample promotes the ionization and volatilization of solid sample from the emitter at substantially lower temperatures. Accordingly, any polymeric organic material or salt recognized in the prior art as accelerating or enhancing the ionization and volitilization of solid sample from an emitter can be employed in the present method. Thus, as shown by *Anbar et al.* (*Anal. Chem.*, 48, 198 (1976)), when a solid to be analyzed is deposited on a conductive element of an emitter from an aqueous solution containing 10% polyvinyl alcohol, sucrose and $10^{-5}$M sodium chloride and then the sample is subsequently heated, the temperature at which ions are observed from the solid sample is decreased by as much as 250° C. Similarly, *Veith* (*Angew. Chem.*, 88, 762 (1976)) has shown that $Li(+)[B(C_6H_5)_4](-)$ and $Li(+)[BCH_3(C_6H_5)_3](-)$ acting as $Li(+)$ donors, lower the temperature required for the production of ions from a solid on conductive element 35 of an emitter in field desorption techniques by as much as several hundred degrees. Other types of materials which can be incorporated in the solid sample include the lithium salts of ion exchange resins. The amount of ionization-volatilization promoter incorporated in the sample is not critical and need only be present in an amount to promote the generation of gaseous ions from the solid sample. However, normally the ionization-volatilization promoter is present in an amount ranging from 0.1 to 10 times on a molar basis the amount of sample present. It is believed that the ionizaton-volatilization promoters function by lowering the melting point of the solid sample and therefore the temperature at which the sample matrix becomes a semi-fluid and thus capable of migrating along the surface of the emitter to the sharp tips or edges protruding therefrom.

It is believed that one of several mechanisms is responsible for the unique means by which a solid is ionized and vaporized by the technique of the present invention. While oversimplistically and superficially it may appear that the present invention is merely a combination of two known ionization and volatilization techniques, i.e., field desorption and chemical ionization, in fact, the present invention is not just such a simple combination of well known techniques. In the field desorption techniques, a critical factor in the ionization of a sample is the application of a high potential difference between the anode or emitter and the cathode plate which contains the ion entry port to the mass spectrometer analyzer. In the present method, no such high potential field is employed. Moreover, the conventional chemical ionization technique, as patented by Munson is based upon the interaction of gaseous ions which are generated by a high energy radiation and neutral gaseous molecules of the sample to be analyzed. The conventional chemical ionization technique is relegated strictly to interactions between a gaseous reactant and a gaseous sample. Accordingly, conventional chemical ionization is not applicable to the analysis of nonvolatile or thermally labile sample molecules.

One possible mechanism by which ionization and volatilization of the sample may occur in the present invention involves creation of a strong field at the emitter surface by the close approach of a gaseous reactant ion. Qualitative calculations indicate that the field induced at a molecule located on the edge or tip of a highly irregular surface, i.e., emitter, a gaseous reactant ion four angstroms away can be 0.05 to 0.5 V/angstrom. This is on the same order of the electrostatic field applied externally in FD methodology and should be sufficient to induce tunneling of an electron from molecules of the solid to the emitter surface thereby generating a sample ion which then desorbs from the surface of the emitter.

Another possible mechanism for the ionization and volatilization of the solid sample involves the reaction of a gaseous ion from the gas phase over the emitter with molecules of sample on the peaks or edges of the emitter. This process would generate ions on the surface by gaseous ion-solid sample interactions. The exothermicity of the ionization step could be sufficient to overcome surface-ion and molecule-ion interactions and thus facilitate volatilization of the ions into the gaseous phase.

Still another plausible mechanism for the generation of ions by the present technique would involve the thermal desorption of sample molecules from the emitter, and subsequent ionization of the vaporized sample molecules by gas ion-neutral molecule interactions.

Having generally described this invention, a further understanding can be obtained by reference to certain specific examples which are provided herein for purposes of illustration only and are not intended to be limiting unless otherwise specified.

All spectra were recorded on Finnigan Model 3200 or 3300 quadrupole mass spectrometers equipped with standard CI sources and an Incos 2300 data system. Primary ionization of the methane CI reagent gas was accomplished using 100-eV electrons generated from a heated rhenium filament. The methane CI reagent gas pressure was maintained at 0.5 torr. Source temperatures were in the range 100°-250° C. unless otherwise specified.

SAMPLE PREPARATION AND INTRODUCTION

Using a 10-μL syringe, one drop of a solution containing sample dissolved in a suitable solvent such as water, methanol, or acetone (0.1-50 μg/μL) was placed on the FD emitter. Evaporation of the solvent left a thin film of sample deposited on the emitter surface. The emitters consisted of tungsten wire (10 μm) that had previously been activated by high temperature treatment in the presence of benzonitrile. This process produces a growth of carbon microneedles approximately 25 μm in length on the surface of the tungsten wire. To facilitate sample introduction, the repeller assembly was removed from the back of the Finnigan CI source. The emitter mount was then pressed against the ion source wall over the hole vacated by the repeller. In this configuration, the emitter wire penetrated the ionization chamber to a point directly on line with the electron entrance hole and 3 mm back from the ion exit port.

PROCEDURE FOR RECORDING MASS SPECTRA

Two procedures were employed to record spectra. In Procedure 1, current was passed through the emitter in 1-mA increments until the best emitter temperature (BET) was reached. BET is defined as the emitter temperature (current) that affords the highest abundance of ions characteristic of sample molecular weight. In Procedure 2, the emitter power supply was present to deliver 2-3 mA of current above that required for the BET. A scan of the mass range of the spectrometer and rapid heating (in the range up to several milliamps/sec.) of the emitter solids probe was then initiated simultaneously.

Use of Procedure 1 maximizes sample lifetime on the emitter and permits multiple scans of the spectrum to be taken. The disadvantage of this technique is that ions characteristic of thermal decomposition of the sample frequently dominate the spectra. Use of Procedure 2 reduces the contribution of ions derived from thermolysis fragments and enhances the abundance of ions characteristic of sample molecular weight.

CHEMICALS

Methane (99.97%) was purchased from Matheson Gas Products, Inc., East Rutherford, N.J. Guanosine, c-AMP, creatine and choline chloride were purchased from Sigma Chemical Co., St. Louis, Mo. Arginine hydrochloride was obtained from Seikagaku Kogyo Co., Ltd., Tokyo, Japan. Dioxathon was received from the U.S. Environmental Protection Agency Pesticide Reference Standard Repository, Health Effects Research Laboratory, Office of Research and Development, USEPA, Research Triangle Park, N.C. CBz-glycl-prolyl-leucyl-alanyl-proline and glycyl-histidyl-lysine were purchased from Bachem Inc., Marina-Del Rey, Calif. All samples were used as received.

ANALYSIS OF SPECIFIC COMPOUNDS

Example 1-Guanosine

The thermal decomposition of guanosine occurs at its melting point of 240° C. Since such conventional methods of mass spectrometric analysis as electron impact (EI) and field ionization (FI) require a minimum solid probe temperature of 250° C. for the volatilization of guanosine, spectra obtained by these techniques fail to contain molecular ion peaks. By contrast, the conventional field desorption mass spectrum of guanosine employs a probe temperature ranging from 180° C.-200° C. and a molecular ion peak $(M^+)$ is obtained whose relative abundance is 20% that of the base peak at m/e 151 $(B+H)^+$. When guanosine was measured by the activated emitter technique of the present invention, the resulting spectrum contained an abundant ion characteristic of sample molecular weight $(M+1)^+$. Moreover, the spectrum also contained the usual adduct ions, $(M+C_2H_5)^+$ and $(M+C_3H_5)^+$ which are encountered in most methane chemical ionization spectra at m/e 312 and 324, respectively. The base peak in the spectra occurs at m/e 152 and corresponds to protonated guanine $BH_2^+$. $(BH+C_2H_5)^+$ and $(BH+C_3H_5)^+$ ions are also observed at m/e 180 and 192, respectively. These and other fragments belong to a family of ion types generally observed in nucleoside methane CI spectra.

EXAMPLE 2-CYCLIC ADENOSINE MONOPHOSPHATE (c-AMP)

Cyclic adenosine monophosphate (c-AMP) can be characterized by chemical ionization (CI) mass spectrometry if the technique of the present invention which employs an activated emitter solid probe is employed. Identification of molecular weight is facilitated by the occurrence of $(M+H)^+$, and $(M+C_2H_5)^+$ and $(M+C_3H_5)^+$ ions at m/e 330, 358 and 370, respectively. Fragment ions at m/e 136,195 and 232 identify the base, sugar, and phosphoric acid ester moieties in the molecule. No ions characteristic of molecular weight are observed when the methane CI spectrum of c-AMP is recorded using the conventional solid probe technique.

EXAMPLE 3-CREATINE AND ARGININE HYDROCHLORIDE

Most amino acids can be successfully characterized by their electron impact (EI) or CI mass spectra. Creatine and arginine are exceptions. These two compounds do not form ions characteristic of sample molecular weight under conventional EI, CI, or FI conditions. Thermal dehydration of creatine and arginine to lactams at temperatures below that required for volatilization is thought to be responsible for the above behavior. In contrast to the above situation, FD methodology affords excellent spectra of both compounds. Thermal energy transfer to the sample is greatly reduced in the field desorption mode and the resulting spectra contain abundant $(M+1)^+$ ions for both arginine and creatine. The FD spectrum of creatine also shows ions corresponding to protonated lactam (m/e 114) and $(M+H)^+$ -HCOOH (m/e 86). Major fragments in the FD spectrum of arginine occur at m/e 158 and 117 correspond to loss of ammonia and the guanidino group respectively from the $(M+1)^+$ ion.

When creatine is analyzed by the activated emitter solids probe of the present invention, two ions, corresponding to $(M+1)^+$ (m/e 132) and protonated lactam (m/e 114), dominate the spectrum. Ions resulting from the addition of $C_2H_5^+$ and $C_3H_5^+$ to both creatine (m/e 160 and 172) and the lactam, creatinine (m/e 142 and 154), are also observed.

Use of the activated emitter solid probe technique of the present invention also affords an easily interpreted mass spectrum of arginine hydrochloride. $(M+1)^+$, $(M+29)^+$, and $(M+41)^+$ ions are formed from free arginine (m/e 175, 203, 215), the lactam (m/e 157, 185, 197), and arginine—$NH_3$ (m/e 158, 186, 198). Ions corresponding to loss of the carboxyl plus guanidino groups from the $(M+1)^+$ ion, loss of NHCNH from the lactam, and loss of the guanidino group from the $(M+1)^+$ ion occur at m/e 70, 115 and 116, respectively.

EXAMPLE 4-DIOXATHON

Many commercially available pesticides are esters of phosphoric or thiophosphoric acid. These classes of compounds uniformly fail to give molecular ions in their electron impact (EI) spectra. Use of conventional field ionization (FI) or CI techniques facilitate identification of many compounds in these groups but neither ionization mode affords a molecular ion or protonated molecular ion from Dioxathon. The ions at highest mass in the FI (m/e 270) and CI (m/e 271) spectrum of Dioxathon correspond to loss of $(EtO)_2PSSH$ from the $M^+$ or $(M+1)^+$ ion respectively. An ion corresponding to loss of this same moiety from $M^+$ also occurs in the FD spectrum at m/e 270. In addition, however, the FD spectrum displays an abundant $(M+1)^+$ ion for Dioxathon at m/e 457.

The spectrum obtained by use of the activated emitter solid probe of the present invention contains three ions characteristic of sample mol. weight (m/e 457, 485 and 497), an ion at m/e 271 corresponding to the loss of $(EtO)_2PSSH$ from the $(M+1)^+$ ion, and a number of lower mass fragments many of which are also observed under FD conditions.

EXAMPLE 5-POLYPEPTIDE

The low volatility of most polypeptides limits the utility of EI and CI mass spectrometry for determining the sequence of amino acids present in this important class of compounds. To circumvent this problem, a number of elegant chemical derivatization methods have been developed to enhance the volatility of peptides. Unfortunately these techniques often require a quantity of sample orders of magnitude greater than that needed to record a mass spectrum. To minimize sample consumption, it is desirable to develop methodology which can be employed to sequence the free polypeptide directly.

Field desorption mass spectrometry has shown promise in this regard. Using this technique, ions characteristic of sample and molecular weight have been observed for two pentapeptides and two nonapeptides containing arginine residues. Unfortunately, however, the fragmentation of these polypeptides under FD conditions is insufficient to provide a unique sequence assignment. In addition, reactions on the surface of the activated emitter in the presence of an external electric field can facilitate attachment of hydrogen atoms to, or substraction of hydrogen atoms from, individual fragment ions, as shown in the FD spectrum of CBz-glycyl-prolyl-leucyl-glycyl-proline. As a consequence of these surface reactions, the masses of fragment ions bearing sequence information can only be predicted with a certainty of plus or minus two mass units. Unless this problem can be eliminated, it will be impossible to determine unambiguous structures for many polypeptides using FD methodology at low resolving power.

In contrast to the FD results, spectra of polypeptides generated using the activated emitter solids probe technique of the present invention contain both an abundance of ions characteristic of molecular weight (M+1) as well as predictable C-terminal and N-terminal fragments bearing amino sequence information. With the technique of the present invention the tripeptide glycyl-histidyl-lysine affords a mass spectrum containing both an (M+1) ion (20% relative abundance) as well as identifiable sequence ions corresponding to $A_{1,2}^+$, $A_{1,2,3}^+$ (195 and 233) and $Z_1H_2^+$, $Z_{1,2}H_2^+$, $Z_{1,2,3}H_2^+$ (147, 284, 341).

In the present activated emitter CI spectrum of CBz-glycyl-prolyl-leucyl-alanyl-proline (molecular weight 587) the relative abundances of ions in this spectrum are similar to those obtained in the FD spectrum of the related molecule, CBz-glycyl-prolyl-leucyl-glycyl-proline (molecular weight 574). It is noteworthy, however, that the fragment ions bearing sequence information in the present activated emitter CI spectrum occur at predicted m/e values ($A_{1,2}^+$, $A_{1,2,3}^+$, $A_{1,2,3,4}^+$, $A_{1,2,3,4,5}^+$ = m/e 289, 397, 473, 570; $Z_1H_2^+$, $Z_{1,2}H_2^+$, $Z_{1,2,3}H_2^+$, $Z_{1,2,3,4}H_2^+$, $Z_{1,2,3,4,5}H_2^+$ = 116, 187, 300, 402, 454). As mentioned above, interpretation of the FD spectrum is complicated because hydrogen transfer to or from the fragment ions places an uncertainty of two in the mass assignment of ions bearing sequence information.

EXAMPLE 6-CHOLINE CHLORIDE

At the probe temperature required to generate its EI spectrum (200° C.), choline chloride suffers thermal decomposition to the tertiary amine, β-(N,N-dimethylamino) ethanol, and methyl chloride. The resulting mass spectrum contains only ions characteristic of β-(N,N-dimethylamino) ethanol. The direct source insertion CI spectrum of choline chloride is obtained at a probe temperature of 150° C. but still fails to show an ion uniquely characteristic of the quaternary salt. Only ions derived from the tertiary amine are observed. In contrast to the above situation, the FD spectrum of choline chloride exhibits as the base peak in the quaternary ammonium ion at m/e 104. An abundant ion corresponding to the molecular ion of the tertiary amine (m/e 89) is observed.

A result similar to that afforded by FD methodology is also obtained using the present activated emitter solids probe CI technique. The spectrum contains strong signals corresponding to the quarternary ammonium ion as well as $(M+1)^+$, $(M+29)^+$, and $(M+41)^+$ ions derived from the tertiary amine.

EXAMPLE 7-SODIUM AND POTASSIUM BENZOATE

Recently, the acetate and 2,2-dimethylpropionate salts of the five alkali metals were shown to give EI spectra containing abundant $(R\,COOM_2)^+$ ions. In our laboratory, the use of either of the above EI technique or direct source insertion CI to ionize sodium or potassium benzoate fails to produce a mass spectrum containing ions characteristic of either salt. At temperatures between 350°-400° C. thermal decomposition of the sample occurs and a spectrum of benzoic acid is obtained from both of the above compounds. Rapid intermolecular hydrogen transfer reactions on the surface of the solids probe are assumed to be responsible for the above behavior since a spectrum of pure benzoic acid can be obtained at room temperature using the above ionization techniques.

One of the most striking features of FD mass spectrometry is its ability to produce structural informative mass spectra from alkali metal salts of organic molecules. It is assumed that the thermal energy required to ionize and vaporize salts under field desorption conditions is only that required to promote movement of the salt molecules on the surface of the activated emitter to the ionization zone at the tips of the microneedles. Ionization of the sample is then thought to occur under the influence of the high external electric field without additional heating. It is estimated that the total thermal energy involved in this process may be two or three times smaller than that required for direct thermal vaporization.

In general, FD spectra of carboxylic acid sodium salts contain abundant ions corresponding to (a) the attachment of $Na^+$ to one or more salt molecules (clusters of the type $(RCOONa)_nNa^+$ where n=1-6), (b) protonated salt molecules, (c) ions characteristic of the neutral carboxylic acid, and (d) fragment ions derived from the thermal decomposition of the salt molecules.

Results from tests with the present activated-emitter solids probe CI technique can also be employed to characterize alkali metal organic salts. The second most abundant ion (m/e 199) in the CI spectrum of potassium benzoate, results from attachment of a potassium ion to the salt molecule. Cluster ions containing a potassium ion attached to two (m/e 359) and three (m/e 519) molecules of salt and ions formed by attachment of a proton to both benzoic acid (m/e 123) and its potassium salt (m/e 161) are also observed. Sodium benzoate affords a spectrum containing the same ion types.

Having now fully described the invention, it will be apparent to one of ordinary skill in the art that many changes and modifications can be made thereto without departing from the spirit or scope of the invention as set forth herein.

What is claimed as new and desired to be secured by letters patent of the United States is:

1. An apparatus for ionizing and vaporizing nonvolatile or thermally labile molecules of a sample for introduction into a mass spectrometer analyzer, which comprises:

a housing containing an ionization chamber;

an ion exit port for the introduction of gaseous ions from said ionization chamber into a mass spectrometer analyzer on the portion of the housing attached to said mass spectrometer analyzer;

inlet means for introducing a gaseous reactant into said ionization chamber within said housing;

inlet means for admitting high energy radiation into said ionization chamber within said housing to at least partially ionize the molecules of said gaseous reactant;

aperture means open into said ionization chamber of said housing for admitting a conductive emitter characterized by having a conductive element of a highly irregular surface upon which is deposited said sample for analysis into said mass spectrometer analyzer; and a vacuum exit aperture in said housing by which the pressure within said ionization chamber can be reduced.

2. The apparatus of claim 1, wherein said conductive emitter is a thin conductive wire, a razor blade, a conductive tungsten wire upon which is deposited carbon microneedles or other carbon surface, or a conductive tungsten wire with dendrites deposited thereon.

3. The apparatus of claim 2, wherein said conductive emitter is a tungsten wire covered with carbon microneedles.

4. The apparatus of claim 1, wherein said inlet means for introducing said high energy radiation into said ionization chamber is an inlet port which opens into said ionization chamber.

5. The apparatus of claim 1, wherein a diffusion pump is attached to said vacuum exit port to reduce the pressure within said ionization chamber.

6. The apparatus of claim 1, wherein said conductive emitter comprises:

a ceramic base in which is embedded two conductive poles protruding through both surfaces of the base; and a conductive element having a highly irregular surface each end of which is attached to one of said conductive poles.

7. The apparatus of claim 6, wherein a conductive lead is attached to each of said conductive poles.

8. The apparatus of claim 1, wherein said emitter is positioned within several tenths of a millimeter to several millimeters from said ion exit port.

* * * * *